(12) United States Patent
Pham et al.

(10) Patent No.: US 9,825,676 B2
(45) Date of Patent: Nov. 21, 2017

(54) GENERATING PRECODERS FOR JOINT TRANSMISSION FROM MULTIPLE TRANSMISSION POINTS TO MULTIPLE USER EQUIPMENTS IN A DOWNLINK COORDINATED MULTIPOINT TRANSMISSION/RECEPTION COMMUNICATIONS SYSTEM

(71) Applicant: NEC Corporation, Tokyo (JP)

(72) Inventors: Duong Pham, Victoria (AU); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 54 days.

(21) Appl. No.: 14/903,065

(22) PCT Filed: Aug. 5, 2014

(86) PCT No.: PCT/JP2014/071349
§ 371 (c)(1),
(2) Date: Jan. 6, 2016

(87) PCT Pub. No.: WO2015/020232
PCT Pub. Date: Feb. 12, 2015

(65) Prior Publication Data
US 2016/0164578 A1    Jun. 9, 2016

(30) Foreign Application Priority Data
Aug. 7, 2013 (AU) ................................ 2013902955

(51) Int. Cl.
*H04B 7/02* (2017.01)
*H04B 7/024* (2017.01)
(Continued)

(52) U.S. Cl.
CPC ........... *H04B 7/024* (2013.01); *H04B 7/0626* (2013.01); *H04B 7/0639* (2013.01); *H04L 5/0035* (2013.01)

(58) Field of Classification Search
None
See application file for complete search history.

(56) References Cited

U.S. PATENT DOCUMENTS

| 9,325,390 B2 | 4/2016 | Ding et al. |
| 2010/0027456 A1* | 2/2010 | Onggosanusi ......... H04B 7/024 370/312 |

(Continued)

FOREIGN PATENT DOCUMENTS

| JP | 2012-531129 | 12/2012 |
| WO | 2010/061724 | 6/2010 |

(Continued)

OTHER PUBLICATIONS

Japanese Official Action—2016-506015—Oct. 25, 2016.

(Continued)

*Primary Examiner* — Brian Roberts
(74) *Attorney, Agent, or Firm* — Young & Thompson (57) ABSTRACT

There is provided generating precoders for joint transmission (JT) in a downlink coordinated multi-point transmission/reception (DL COMP) wireless communications system. The system includes a plurality of transmission points (TPs) operable to communicate with a plurality of user equipments (UEs). Each UE has one of the TPs as its serving TP. The method includes transmitting channel state information (CSI) from each UE to its serving TP, wherein the transmitted CSI includes precoder matrix indicators (PMI), and using the PMI to generate precoders for transmission of data from the plurality of TPs to the plurality of UEs.

20 Claims, 10 Drawing Sheets (51) Int. Cl.
*H04B 7/06* (2006.01)
*H04L 5/00* (2006.01)

(56) References Cited

U.S. PATENT DOCUMENTS

| | | | |
|---|---|---|---|
| 2011/0009125 A1* | 1/2011 | Shin | H04B 7/024 455/452.1 |
| 2011/0103287 A1 | 5/2011 | Ma et al. | |
| 2012/0099470 A1 | 4/2012 | Li et al. | |
| 2012/0207092 A1 | 8/2012 | Zirwas et al. | |
| 2012/0287799 A1 | 11/2012 | Chen et al. | |
| 2013/0003788 A1 | 1/2013 | Marinier et al. | |
| 2013/0021925 A1 | 1/2013 | Yin et al. | |
| 2013/0083681 A1 | 4/2013 | Mahalleh et al. | |
| 2013/0089159 A1 | 4/2013 | Liu | |
| 2013/0094380 A1 | 4/2013 | Taoka et al. | |
| 2013/0114513 A1 | 5/2013 | Taoka et al. | |
| 2013/0114656 A1* | 5/2013 | Sayana | H04B 7/024 375/219 |
| 2013/0229992 A1 | 9/2013 | Yue et al. | |
| 2014/0254701 A1* | 9/2014 | Geirhofer | H04B 7/0626 375/267 |
| 2015/0195024 A1* | 7/2015 | Kim | H04B 7/0456 375/295 |

FOREIGN PATENT DOCUMENTS

| | | |
|---|---|---|
| WO | WO 2011/158302 | 12/2011 |
| WO | WO 2012/094608 | 7/2012 |
| WO | WO 2013/112829 | 8/2013 |

OTHER PUBLICATIONS

Huawei, System Performance Evaluation of Downlink CoMP, 3GPP TSG-RAN WG1#56 R1-090822, Feb. 13, 2009, pp. 2-5.

Qualcomm Incorporated, On the need for supporting aggregated feedback for CoMP. 3GPP TSG-RAN WG1#68 R1-120545, Feb. 10, 2012, pp. 2-4.

Zhijie Zhang et al., A Dynamically-Updating Adaptive Codebook Design for CoMP Joint Transmission, 2012 International Conference on Systems and Informatics, May 20, 2012, pp. 1407-1411.

International Search Report, PCT/JP2014/071349, dated Nov. 11, 2014.

NTT DOCOMO, Investigation of Aggregated CQI Feedback in Rel-11 CoMP, 3GPP TSG-RAN WG1 Meeting#69, R1-121933, 3GPP, May 25, 2012.

3GPP TS 36.211 V11.3.0 (Jun. 2013), Technical Specification Group Radio Access Network; Evolved Universal Terrestrial Radio Access (E-UTRA); Physical Channels and Modulation (Release 11).

Extended European Search Report—EP 14 83 5060—dated Feb. 14, 2017.

* cited by examiner

801 — For all UE#i, from the reported CQI for the serving TP, find the $SINR_{i1}$ from SINR threshold in the CQI table 802 — Estimate for all UE#i the noise variance using the $SINR_{i1}$ and the serving TP's power $P_s$ $$\sigma_i^2 = \frac{P_s / N_{UE}}{\sum_{l=1}^{L_i} SINR_{il} / L_i}, \quad i = 1,...,N_{UE}$$

Fig. 9

GENERATING PRECODERS FOR JOINT TRANSMISSION FROM MULTIPLE TRANSMISSION POINTS TO MULTIPLE USER EQUIPMENTS IN A DOWNLINK COORDINATED MULTIPOINT TRANSMISSION/RECEPTION COMMUNICATIONS SYSTEM

TECHNICAL FIELD

The present invention relates to generating precoders for joint transmission (JT) from multiple transmission points to multiple user equipments in a Downlink Coordinated Multi-Point transmission/reception (DL CoMP) communications system.

BACKGROUND ART

The following abbreviations are used herein:

| | |
|---|---|
| CoMP | Coordinated Multi-Point (the abbreviation CoMP often also means Coordinated Multi-Point transmission/reception, as will be evident from the context) |
| CQI | Channel Quality Indicator |
| CSI | Channel State Information - CSI includes PMI, RI, CQI (see below) |
| DL | Downlink |
| DMRS | Demodulation Reference Signal |
| eNodeB | Evolved NodeB (i.e. evolved base station) |
| JT | Joint Transmission |
| MMSE | Minimum Mean Squared Error |
| PMI | Precoder Matrix Indicator |
| SINR | Signal to Interference plus Noise Ratio |
| RI | Rank Indicator |
| TP | Transmission Point |
| UE | User Equipment |

Also, the following mathematical notations are adopted herein:

|a| denotes the absolute value of a;
$\|a\|^2 = |a(1)|^2 + \ldots + |a(N)|^2$ (unless stated otherwise);
Ea denotes the expectation (or expected value) of a; and
For any matrix A, $A^H$ denotes the conjugate transpose of A, and tr(A) represents the operation of taking the trace of A.

Joint Transmission Downlink Coordinated Multi-Point transmission/reception (JT-DL CoMP).

Figure 1:
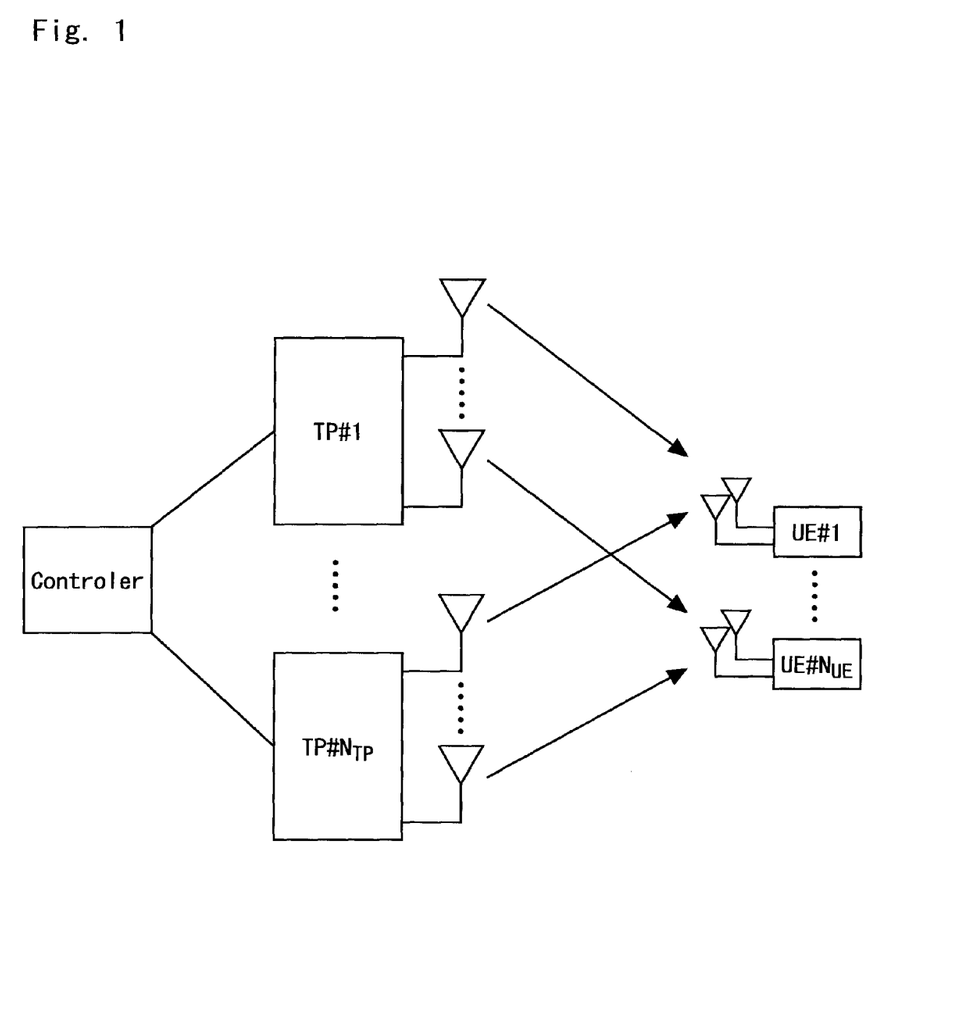
FIG. 1 is schematically represents a JT-DL CoMP system.

FIG. 1 schematically represents JT in a DL CoMP system. The system includes multiple TPs (these may be eNodeBs), each TP being equipped with multiple antennas, and multiple UEs where each UE is also equipped with multiple antennas. The multiple TPs transmit data to the multiple UEs on the same time-frequency. Generally, to minimise interferences between TPs and between UEs, the transmission is carried out with CoMP precoders which are generated based on (i.e. generated from the knowledge of) the channel state information (CSI).

Figure 2:
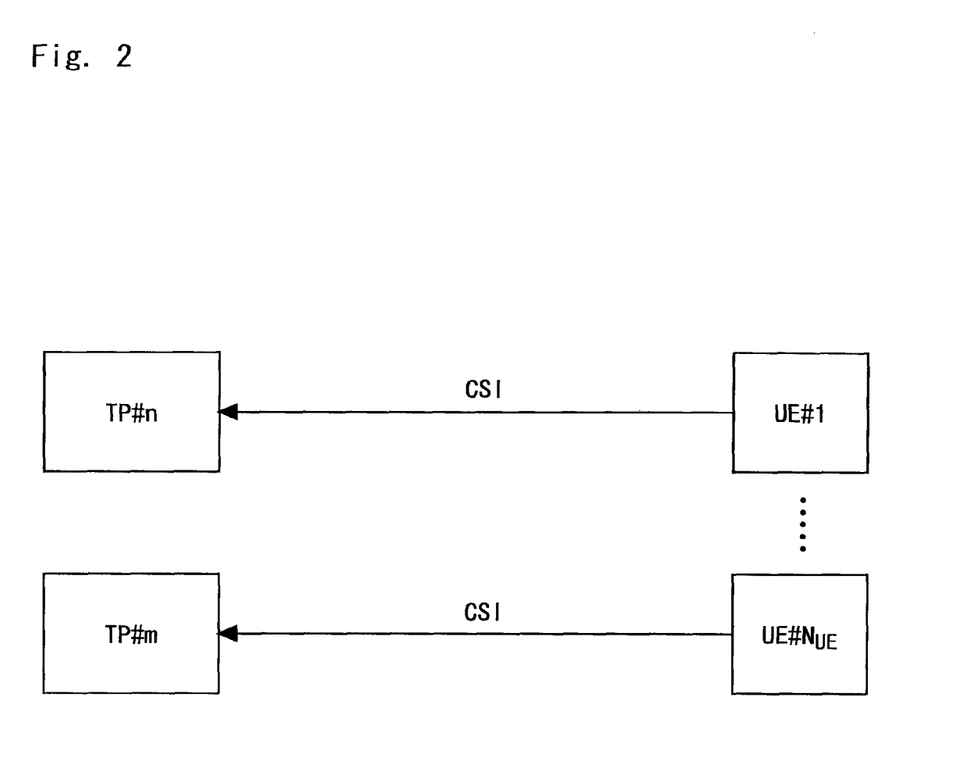
FIG. 2 is schematically represents the way each UE feeds back CSI to its serving TP via uplink.

Each UE feeds back CSI (which includes RI, PMI and CQI) to its serving TP via uplink, as illustrated in FIG. 2.

Figure 3A:
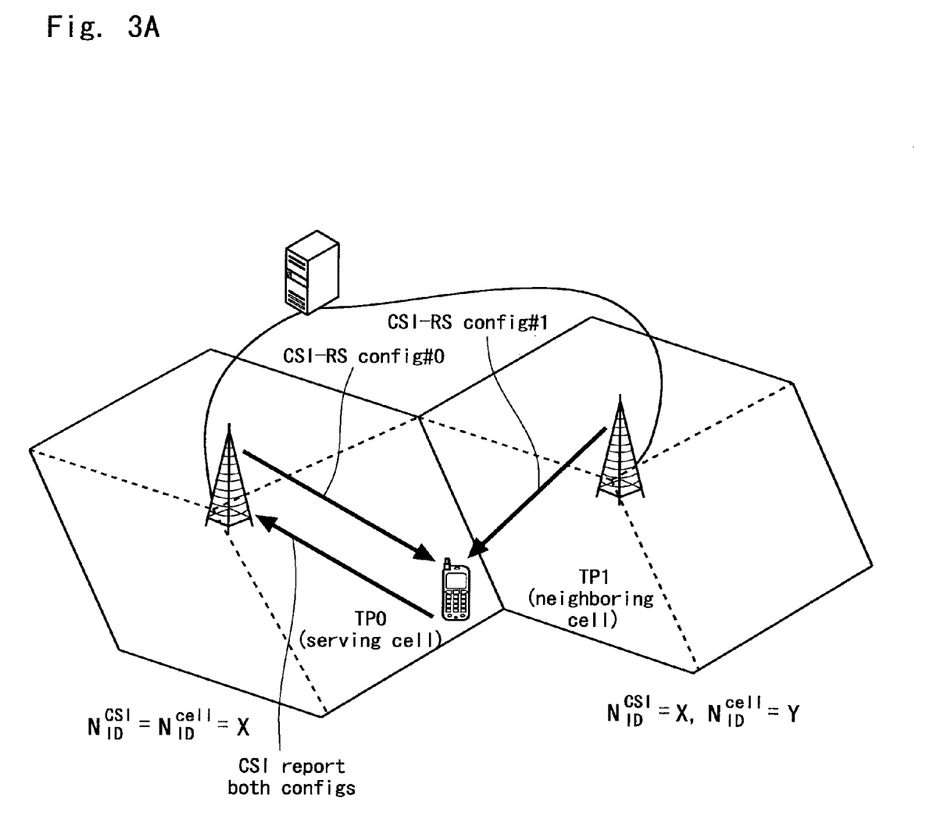
FIG. 3A schematically illustrates CSI measurement for JT-DL CoMP.
Figure 3B:
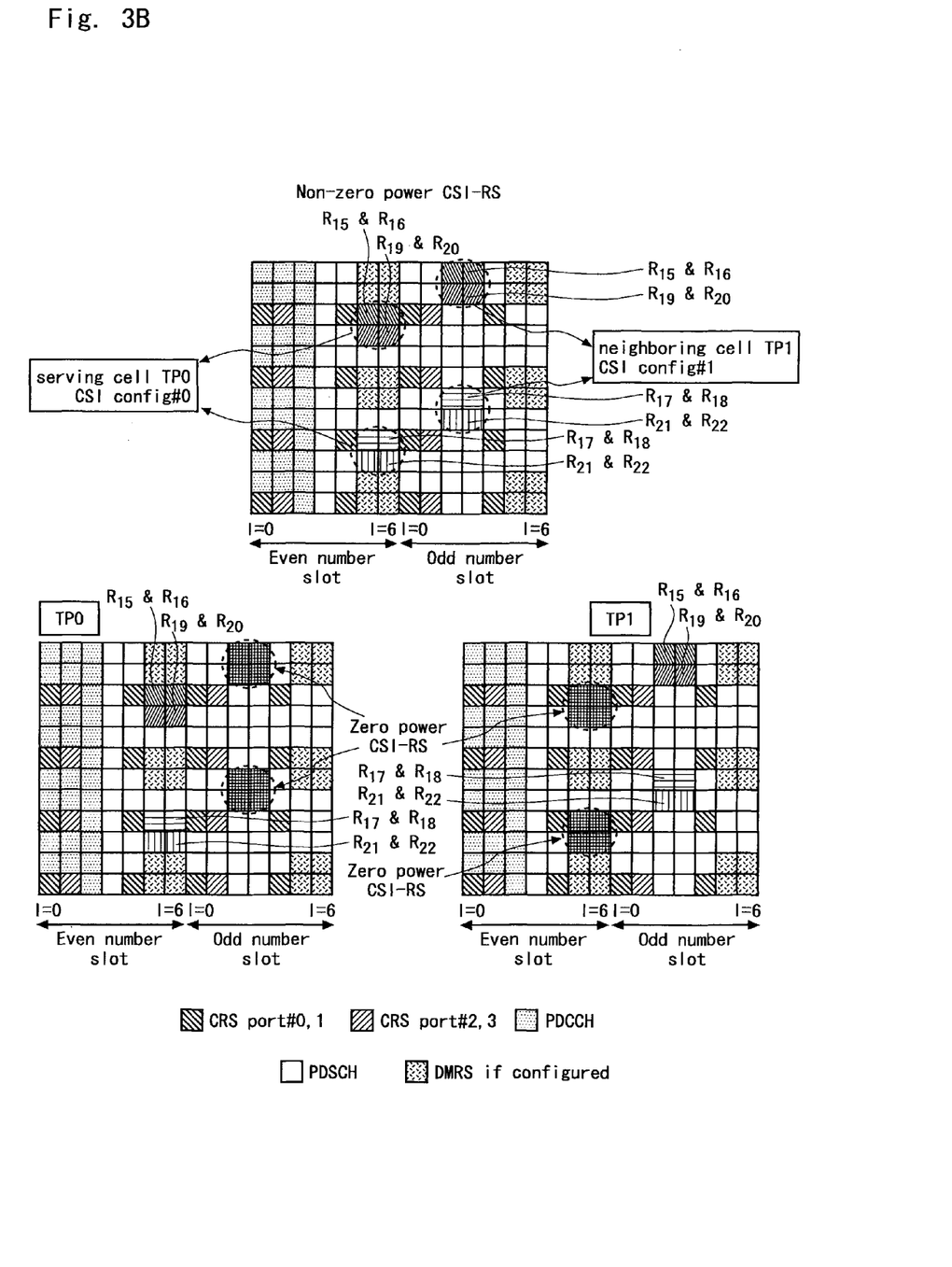
FIG. 3B schematically illustrates CSI measurement for JT-DL CoMP.

In CSI measurement, for each UE there are as many CSI configurations as there are TPs involved in JT-DL CoMP. FIGS. 3A and 3B show CSI measurement for a UE involved in JT-DL CoMP with two TPs. The CSI config#0 is for TP#0 (the serving TP) and the CSI config#1 is for TP#1 (the neighbouring TP).

System Description

A JT DL CoMP system having $N_{TP}$ TPs and $N_{UE}$ UEs may be described mathematically as set out below.

Let $\tau_n$ denote the number of antennas at the n-th TP. The total number of transmit antennas $N_{TX}$ used in DL CoMP transmission is:

$$N_{TX} = \sum_{n=1}^{N_{TP}} \tau_n.$$

Let $N_{RX}$ denote the number of receive antennas at each UE, and let $H_{in}$ (size $N_{RX} \times \tau_n$) denote the channel between the n-th TP and the i-th UE.

Then the DL CoMP channel of the i-th UE (size $N_{RX} \times N_{TX}$) is:

$$H_i = [H_{i1}, H_{i2}, \ldots, H_{iN_{TP}}], i=1, \ldots, N_{UE} \qquad \text{Equation (1)}$$

Let $V_i$ (size $N_{TX} \times RI_i$) denote the precoder for the i-th UE. The received signal at the i-th UE ($y_i$) is given by:

$$y_i = H_i \sum_{j=1}^{N_{UE}} V_j x_j + n_i, \qquad \text{Equation (2)}$$

$$i = 1, \ldots, N_{UE}$$

where $n_i$ is additive Gaussian noise. Note that, from the DMRS, the i-th UE can find the effective channel $H_i V_i$ to generate a decoder.

Precoding

Precoding is dependent on PMI which is part of the CSI. (Recall that CSI is fed back by a UE to its serving TP via uplink.) Let $p_{in}$ denote the PMI corresponding to $H_{in}$. Note that in a 2-stage PMI codebook system, $p_{in}$ is a pair PMI#1 and PMI#2.

According to the 3GPP standard (TS 36.211), the precoder $W_{in}$ (of size $\tau_n \times RI_i$) associated with the reported PMI $p_{in}$ is used for precoding data to send from the n-th TP to the i-th UE. The total DL CoMP precoder is therefore given by:

$$V_i = \begin{bmatrix} W_{i1} \\ W_{i2} \\ \vdots \\ W_{iN_{TP}} \end{bmatrix}, \qquad \text{Equation (3)}$$

$$i = 1, \ldots, N_{UE}$$

Note that, in a 2-stage PMI codebook system, $W_{in} = W_{in(1)} \times W_{in(2)}$ associated with PMI#1 and PMI#2.

Precoding in this way is not optimal and it may be desirable to provide an improved or at least an alternative way of generating precoders.

It is to be clearly understood that mere reference herein to previous or existing systems, methods, models, processes, procedures, practices, publications or other information, or to any problems or issues, does not constitute an acknowledgement or admission that any of those things individually or in any combination formed part of the common general knowledge of those skilled in the field, or that they are admissible prior art.

SUMMARY OF INVENTION

In one broad form, the invention provides a method for generating precoders for joint transmission (JT) in a downlink coordinated multi-point (DL CoMP) wireless communications system, the system including a plurality of transmission points (TPs) operable to communicate with a plurality of user equipments (UEs) wherein each UE has one of the TPs as its serving TP, and the method comprises:

transmitting channel state information (CSI) from each UE to its serving TP, wherein the transmitted CSI includes precoder matrix indicators (PMI), and using the PMI to generate precoders for transmission of data from the plurality of TPs to the plurality of UEs.

The use of the PMI to generate precoders may involve using the PMI to find a representative matrix ($\hat{H}_{in}$) representing the channel ($H_{in}$) between an n-th TP and an i-th UE. In some embodiments, a fixed codebook ($\Omega_{RI}$) of representative matrices may be generated from PMI codebook(s), the CSI transmitted from each UE to its serving TP may include a rank indicator (RI), and $\Omega_{RI}$ may be different for different RI. In such embodiments, if the RI for the i-th UE ($RI_i$) is equal to the number of receive antennas of the UE ($N_{RX}$) (i.e. if $RI_i=N_{RX}$) then $\Omega_{RI}$ may contain matrices $\hat{H}(m)$, $m=1, \ldots$ of size $N_{RX} \times \tau_n$, where $\tau_n$ is the number of antennas at the n-th TP. Alternatively, if $RI_i$ is less than $N_{RX}$ (i.e. if $RI_i<N_{RX}$) then $\Omega_{RI}$ may contain vectors $\hat{h}(m)$, $m=1, \ldots$ of size $\tau_n \times 1$. Proposals for the way in which $\hat{H}_{in}$ may be calculated in specific embodiments of the invention, both for the case where $RI_i=N_{RX}$, and also the case where $RI_i<R_{RX}$, are discussed below.

It is envisaged that non-coherent precoding may be used in some embodiments (or some embodiments may operate or be used in systems where non-coherent precoding is used), and where this is so the method for generating precoders may further comprise using the representative matrix $\hat{H}_{in}$, a Lagrange multiplier $v_n$ and a noise variance estimate $\sigma_i^2$ to compute the precoders ($V_{in}$). The precoders $V_{in}$ may be computed using an iterative procedure. Proposals for the way in which the precoders $V_{in}$ and the Lagrange multiplier $v_n$ may be calculated for the case of non-coherent precoding in specific embodiments of the invention are discussed below.

Whilst non-coherent precoding may be used in some embodiments of the invention, in other embodiments coherent precoding may be used (or embodiments may operate or be used in systems where coherent precoding is used). Where coherent precoding is used, the method for generating precoders may involve finding the representative matrix ($\hat{H}_{in}$) in the manner described for the case of non-coherent precoding (as discussed above and also in further detail below), and then further finding a representative matrix $\hat{H}_i$ representing the total channel as follows:

$$\hat{H}_i = [\hat{H}_{i1}, \hat{H}_{i2}, \ldots, \hat{H}_{iN_{TP}}], i=1, \ldots, N_{UE}$$

In the case of coherent precoding, the method for generating precoders may further comprise using the said representative matrix $\hat{H}_i$, a Lagrange multiplier $v$ and a noise variance estimate $\sigma_i^2$ to compute the precoders ($V_i$). Like in the case of non-coherent precoding, for the case of coherent precoding the precoders $V_i$ may be computed using an iterative procedure. Proposals for the way in which the precoders $V_i$ and the Lagrange multiplier $v$ may be calculated for the case of coherent precoding in specific embodiments of the invention are discussed below.

Regardless of whether coherent precoding or non-coherent precoding is used, the CSI transmitted from each UE to its serving TP may include (in addition to the PMI) a channel quality indicator (CQI), and the above-mentioned noise variance estimate $\sigma_i^2$ may be found using the CQI by i) finding the signal to interference plus noise ratio ($SINR_{i1}$) based on thresholds in the CQI table; and ii) calculating $\sigma_i^2$ using the $SINR_{i1}$ and the serving TP's transmit power $P_s$. A specific proposal for the way in which this might be done is discussed below.

As mentioned above, the CSI transmitted from each UE to its serving TP may include a rank indicator (RI). Suitably, from the up to $N_{TP}$ reported $RI_{in}$, the majority may be selected as a single common $RI_i$ for the i-th UE. In this case, it may be that only $CQI_{in}(l)$ associated with the selected $RI_i$ are candidates for CQI selection. The selection may be carried out per codeword independently, and the majority among the candidates may be selected as a common CQI for l-th codeword $CQI_i(l)$.

In another broad form, the invention provides a downlink coordinated multi-point (DL CoMP) wireless communications system in which joint transmission (JT) is performed between a plurality of transmission points (TPs) and a plurality of user equipments (UEs), wherein each UE has one of the TPs as its serving TP, channel state information (CSI) is transmitted from each UE to its serving TP, the transmitted CSI includes precoder matrix indicators (PMI), and the PMI is used to generate precoders for transmission of data from the plurality of TPs to the plurality of UEs.

Aspects and features described herein with reference to one form of the invention (e.g. the method form) may also form part of, or be used (in any combination) in any other form of the invention (e.g. the system form). In fact, more generally, any of features or aspects described herein can be combined in any combination with any one or more other features or aspects described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Joint transmit & receive optimisation methods have previously been proposed. See, for example, Sampath H. and Paulraj A., "Joint Transmit and Receive Optimization for High Data Rate Wireless Communication Using Multiple Antennas", *Thirty-Third Asilomar Conference on Signals, Systems, and Computers*, 1999, and Zhang J., et. al., "Joint Linear Transmitter and Receiver Design for Downlink of Multiuser MIMO Systems", *IEEE Communications Letters*, Vol. 9, No. 11, November 2005.

Embodiments of the present invention provide MMSE precoders based (at least somewhat) on the joint transmit & receive optimization methods discussed in the above academic papers. However, unlike the methods in these academic papers, the present invention does not require knowledge of the channel to generate MMSE precoders. Instead (and in contrast), embodiments of the invention require only the PMI, which is fed back by UEs to serving TPs, as shown in FIG. 2. The precoder according to the particular embodiments of the invention discussed below will be referred to as the j-MMSE precoder.

A) Non-Coherent Precoding

In the case of non-coherent precoding, the individual j-MMSE precoder $V_{in}$ is computed using the joint transmit and receive MMSE optimization as follows.

Finding Representative Channels

Let $\Omega_{RI}$ denote the fixed codebook of representative channel matrices which is generated from the PMI codebook(s). There are different $\Omega_{RI}$ for different RI.

For $RI_i = N_{RX}$, the $\Omega_{RI}$ contains matrices $\hat{H}(m)$, $m=1, \ldots$ of size $N_{RX} \times \tau_n$ For $RI_i < N_{RX}$, the $\Omega_{RI}$ contains vectors $\hat{h}(m)$, $m=1, \ldots$ of size $\tau_n \times 1$ Let $\hat{H}_{in}$ be the representative for the channel $H_{in}$. The representative channel is obtained as follows:

If $RI_i = N_{RX}$, then $$\hat{H}_{in} = \hat{H}(m^*) \in \Omega_{RI}, i=1, \ldots, N_{UE}, n=1, \ldots, N_{TP}$$

with $$m^* = \arg\max_m tr\{[\hat{H}(m)W_{in}]^H [\hat{H}(m)W_{in}]\}, \quad \text{Eqaution (4)}$$

$$\hat{H}(m) \in \Omega_{RI}$$

If $RI_i < N_{RX}$, then
1) Calculate correlation values:

$$C_{in}(m) = tr\{[\hat{h}^H(m)W_{in}]^H [\hat{h}^H(m)W_{in}]\}, m=1, \quad \text{Equation (5)}$$

and

2) Sort to find the $N_{RX}$ correlation values $C_{in}(m_1) > C_{in}(m_2) > \ldots > C_{in}(m_{N_{RX}})$ and the $N_{RX}$ corresponding $\hat{h}(m_1), \hat{h}(m_2), \ldots, \hat{h}(m_{N_{RX}})$ to form the channel matrix $$\hat{H}_{in} = [\hat{h}(m_1), \hat{h}(m_2), \ldots, \hat{h}(m_{N_{RX}})]^H \quad \text{Equation (6)}$$

Here $W_{in}$ (of size $\tau_n \times RI_i$) is the precoder in the 3GPP standard (TS 36.211) associated with the PMI $p_{in}$. Note that, if the PMI consists of PMI#1 and PMI#2, then $W_{in} = W_{in(1)} \times W_{in(2)}$.

Figure 4:
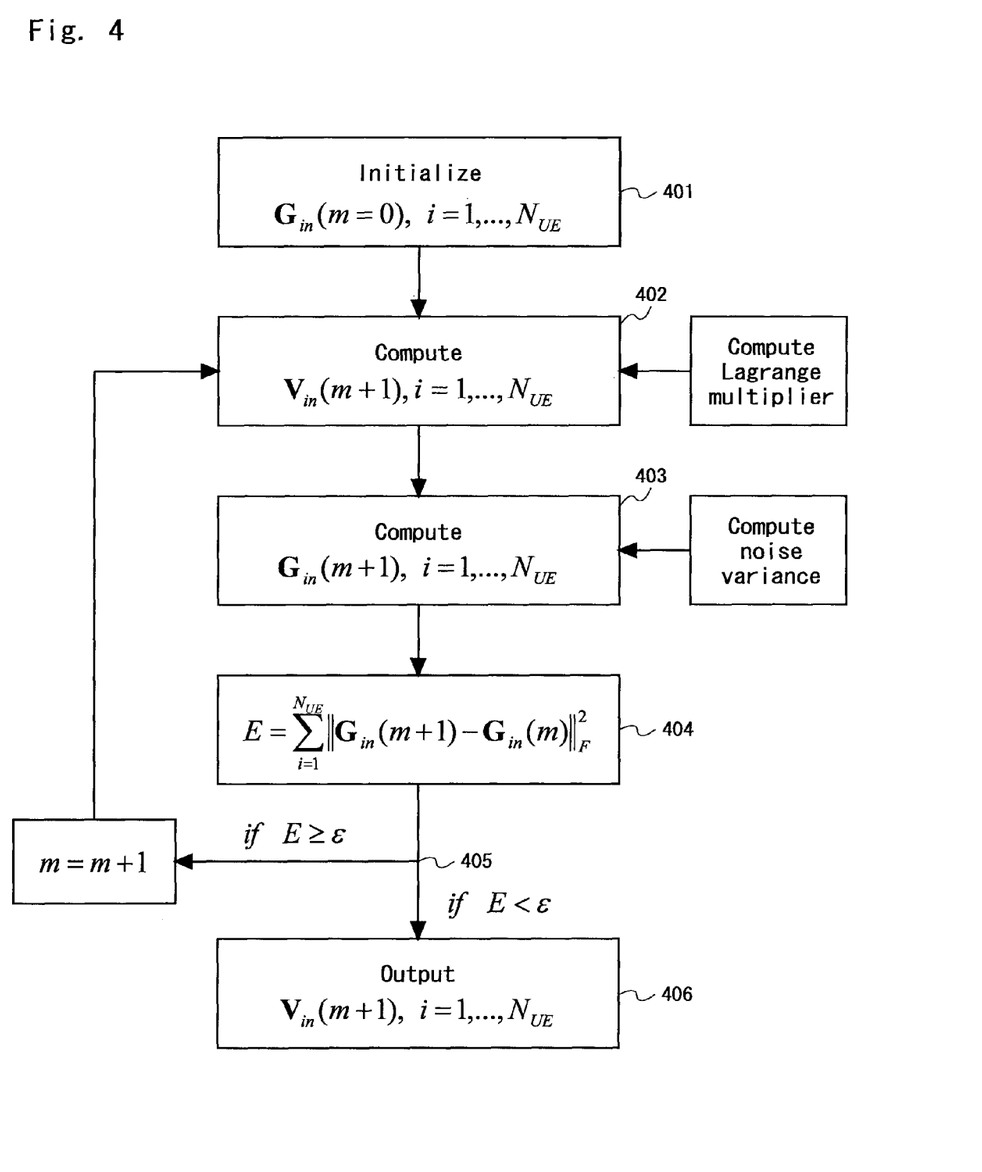
FIG. 4 is a flowchart illustrating, for the case of non-coherent precoding, a method for generating j-MMSE precoders in accordance with the embodiment of the invention discussed below.

Generating the j-MMSE Precoder $V_{in}$ (see FIG. 4)

Let (m) denote the m-th iteration of the procedure. The precoder is generated as follows:

1) (401) Initialize $G_{in}(m=0) = J_{in}$, $i=1, \ldots, N_{UE}$. Here $J_{in}$ is a $RI_i \times \tau_n$ matrix with the (a,b)-th element being zero for $a \neq b$ and being 1 for $a=b$.

2) (402) Compute $V_{in}(m+1)$ using $G_{in}(m)$ and the Lagrange multiplier $v_n$ for $i=1, \ldots, N_{UE}$ as follows.

$$V_{in}(m+1) = \left[\sum_{j=1}^{N_{UE}} \hat{H}_{jn}^H G_{jn}^H(m) G_{jn}(m) \hat{H}_{jn} + v_n I\right]^{-1} \hat{H}_{in}^H G_{in}^H(m) \quad \text{Equation (7)}$$

3) (403) Compute $G_{in}(m+1)$ using $V_{in}(m+1)$ and the given noise variance estimate $\sigma_i^2$ for $i=1, \ldots, N_{UE}$ as follows.

$$G_{in}(m+1) = \quad \text{Equation (8)}$$

$$V_{in}^H(m+1) \hat{H}_{in}^H \left[\sum_{j=1}^{N_{UE}} \hat{H}_{in} V_{jn}(m+1) V_{jn}^H(m+1) \hat{H}_{in}^H + \sigma_i^2 I\right]^{-1}$$

4) (404) Compute $$E = \sum_{i=1}^{N_{UE}} \|G_{in}(m+1) - G_{in}(m)\|_F^2$$

5) (405) increment m and repeat step 2), step 3) and step 4) until $$\sum_{i=1}^{N_{UE}} \|G_{in}(m+1) - G_{in}(m)\|_F^2 < \varepsilon.$$

Here $\|\cdot\|_F^2$ denotes Frobenius norm and $\epsilon$ is the convergent threshold.

6) (406) Output $V_{in}(m+1)$, $i=1, \ldots N_{UE}$.

Figure 5:
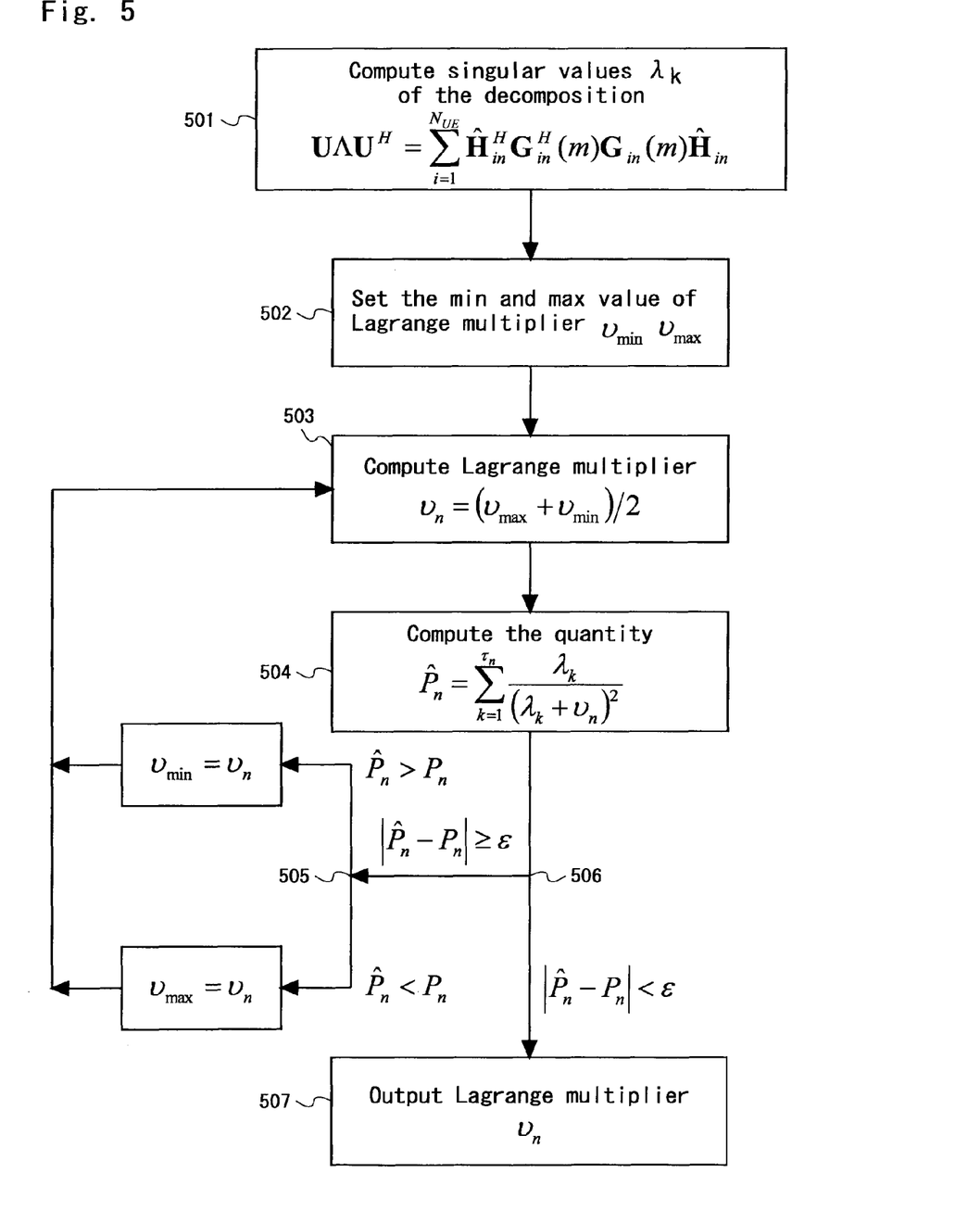
FIG. 5 is a flowchart illustrating, for the case of non-coherent precoding, a method for computing the Lagrange multiplier for the n-th TP.

Computing the Lagrange multiplier $v_n$ (see FIG. 5)

For each of the n-th TP, the Lagrange multiplier $v_n$ is computed as follows.

1) (501) Compute $\lambda_k$ as $$U\Lambda U^H = \sum_{i=1}^{N_{UE}} \hat{H}_{in}^H G_{in}^H(m) G_{in}(m) \hat{H}_{in} \quad \text{Equation (9)}$$

2) (502) Set $v_{min}$ and $v_{max}$
3) (503) Set $v_n = (v_{max} + v_{min})/2$.
4) (504) Compute the following quantity $$\hat{P}_n = \sum_{k=1}^{\tau_n} \frac{\lambda_k}{(\lambda_k + v_n)^2}.$$

5) (505) Check if $\hat{P}_n > P_n$ and if so set $v_{min} = v_n$ otherwise set $v_{max} = v_n$. Here $P_n$ is the transmit power of the n-th TP.
6) (506) Repeat step 3), step 4) and step 5) until $|\hat{P}_n - P_n| < \epsilon$. Here $\epsilon$ is the convergent threshold.
7) (507) Output $v_n$.

B) Coherent Precoding

In the case of coherent precoding, the total j-MMSE precoder V, is computed using the joint transmit and receive MMSE optimization as follows:

Finding Representative Channels

First the individual representative channel $\hat{H}_{in}$ is found as in the non-coherent case discussed above. Then the total channel is generated by:

$$\hat{H}_i = [\hat{H}_{i1}, \hat{H}_{i2}, \ldots, \hat{H}_{iN_{TP}}], i=1, \ldots, N_{UE} \quad \text{Equation (10)}$$

Figure 6:
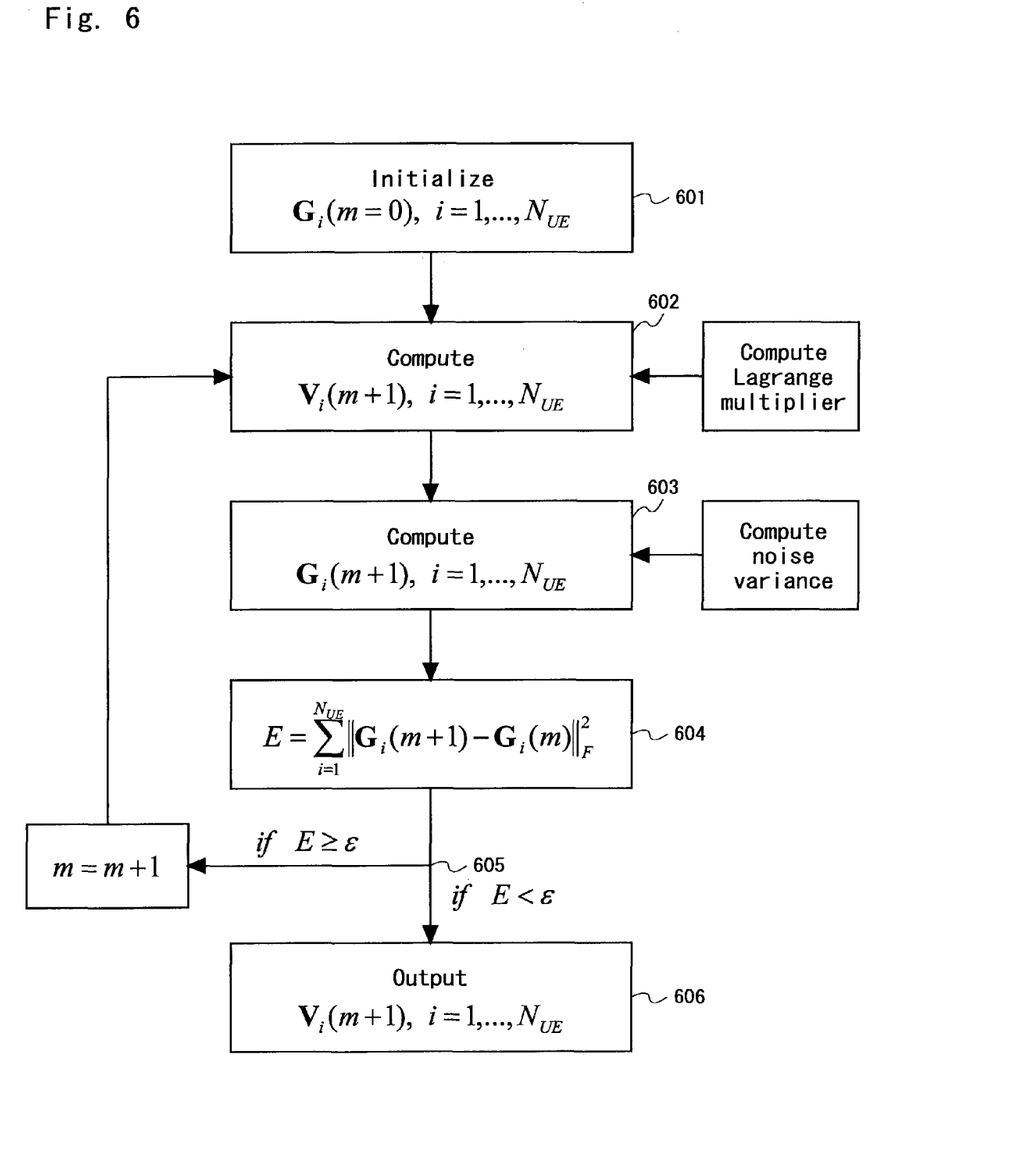
FIG. 6 is a flowchart illustrating, for the case of coherent precoding, a method for generating j-MMSE precoders in accordance with the embodiment of the invention discussed below.

Generating the j-MMSE Precoder $V_i$ (see FIG. 6)

Let (m) denote the m-th iteration of the procedure. The precoder is generated as follows:

a) (601) Initialize $G_i(m=0)=J_i$, i=1, ..., $N_{UE}$. Here $J_i$ is a $RI_i \times N_{TX}$ matrix with the (a,b)-th element being zero for a≠b and being 1 for a=b.

b) (602) Compute $V_i(m+1)$ using $G_i(m)$ and the Lagrange multiplier $\nu$ for i=1, ..., $N_{UE}$ as follows.

$$V_i(m+1) = \left[\sum_{j=1}^{N_{UE}} \hat{H}_j^H G_j^H(m) G_j(m) \hat{H}_j + \nu I\right]^{-1} \hat{H}_i^H G_i^H(m) \quad \text{Equation (11)}$$

c) (603) Compute $G_i(m+1)$ using $V_i(m+1)$ and the given noise variance estimate $\sigma_i^2$ for i=1, ..., $N_{UE}$ as follows.

$$G_i(m+1) = V_i^H(m+1)\hat{H}_i^H \left[\sum_{j=1}^{N_{UE}} \hat{H}_i V_j(m+1) V_j^H(m+1) \hat{H}_i^H + \sigma_i^2 I\right]^{-1} \quad \text{Equation (12)}$$

d) (604) Compute $$E = \sum_{i=1}^{N_{UE}} \|G_i(m+1) - G_i(m)\|_F^2$$

e) (605) increment m and repeat step b), step c) and step d) until $$\sum_{i=1}^{N_{UE}} \|G_i(m+1) - G_i(m)\|_F^2 < \varepsilon.$$

f) (606) Output $V_i(m+1)$, i=1, ... $N_{UE}$

Figure 7:
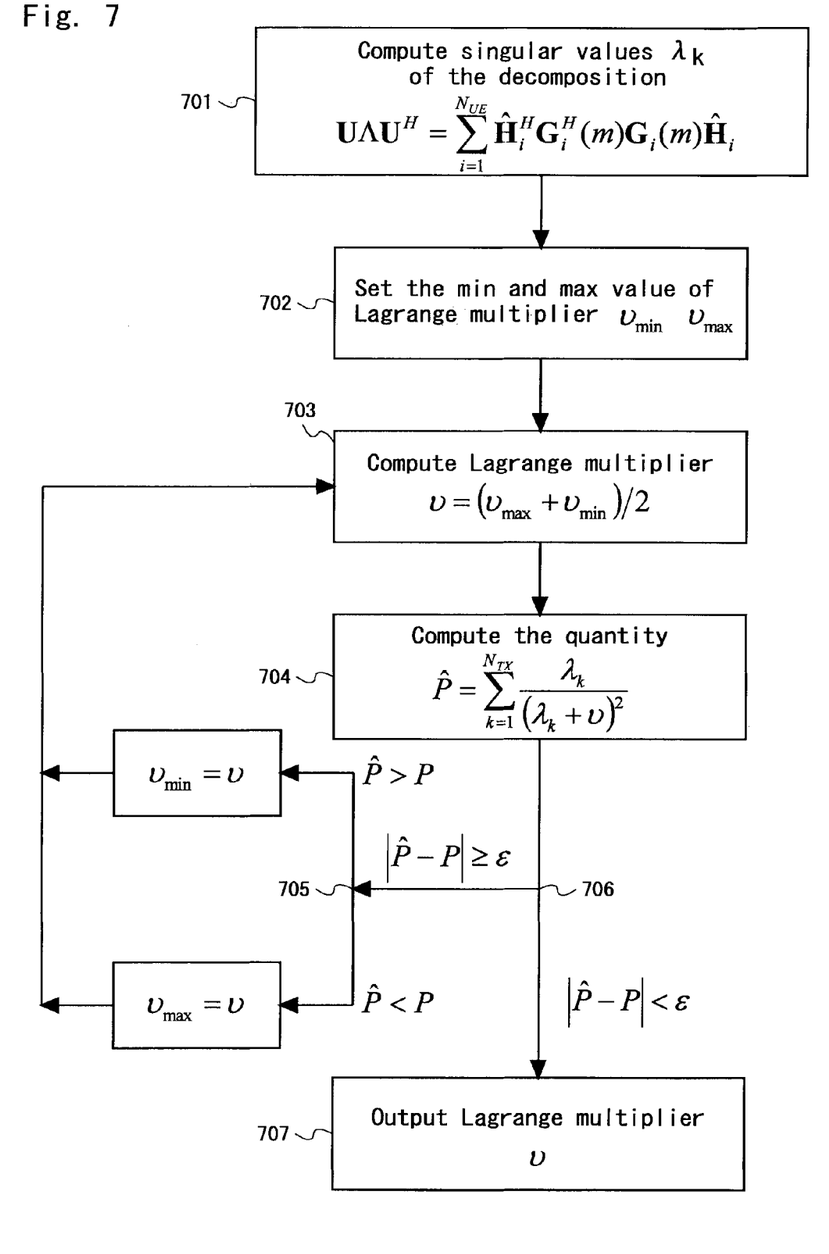
FIG. 7 is a flowchart illustrating, for the case of coherent precoding, a method for computing the Lagrange multiplier for all TPs.

Computing the Lagrange Multiplier $\nu$ (see FIG. 7)

The Lagrange multiplier $\nu$ is obtained as follows.

1) (701) Compute $\lambda_k$ as $$U\Lambda U^H = \sum_{i=1}^{N_{UE}} \hat{H}_i^H G_i^H(m) G_i(m) \hat{H}_i \quad \text{Equation (13)}$$

2) (702) Set $\nu_{min}$ and $\nu_{max}$ 3) (703) Set $\nu=(\nu_{max}+\nu_{min})/2$.

4) (704) Compute the following quantity $$\hat{P} = \sum_{k=1}^{N_{TX}} \frac{\lambda_k}{(\lambda_k + \nu)^2}.$$

5) (705) Check if $\hat{P}>P$ and if so set $\nu_{min}=\nu$ otherwise set $\nu_{max}=\nu$. Here P is the total transmit power, $$P = \sum_{n=1}^{N_{TP}} P_n.$$

6) (706) Repeat step 3), step 4) and step 5) until $|\hat{P}-P|<\epsilon$. Here $\epsilon$ is the convergent threshold.

7) (707) Output the Lagrange multiplier $\nu$.

Figure 8:
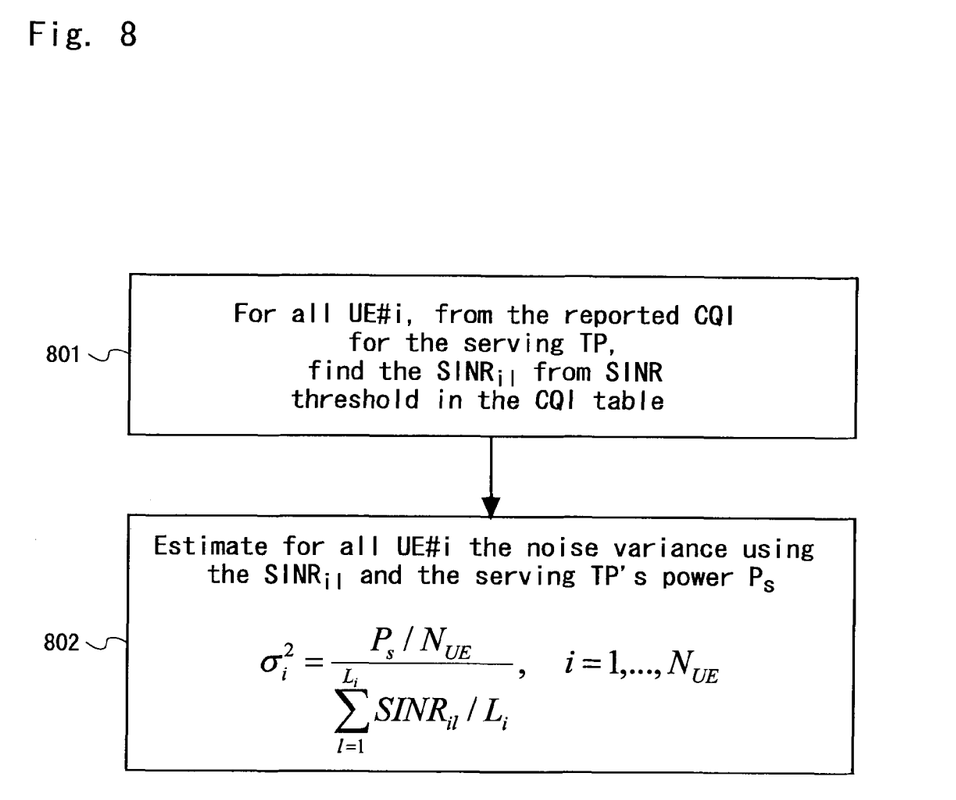
FIG. 8 schematically illustrates the estimation of a UE's noise variance based on the reported CQI of the serving TP.

C) Noise Variance Estimating (see FIG. 8)

The following noise variance estimation may be used for both non-coherent and coherent precoding. The method estimates the UE's noise variance from the reported CQI for the serving TP is as follows:

1) (801) Find $SINR_{i1}$ based on the SINR thresholds in the CQI table.

2) (802) Calculate $\sigma_i^2$ using $SINR_{i1}$ and the serving TP's transmit power $P_s$ as follows.

$$\sigma_i^2 = \frac{P_s/N_{UE}}{\sum_{l=1}^{L_i} SINR_{il}/L_i}, \quad i=1, \ldots, N_{UE} \quad \text{Equation (14)}$$

where $L_i$ the number of codewords used for the i-th UE. For less complexity, the noise variance can be fixed to zero as:

$$\sigma_i^2=0, i=1, \ldots, N_{UE} \quad \text{Equation (15)}$$

Figure 9:
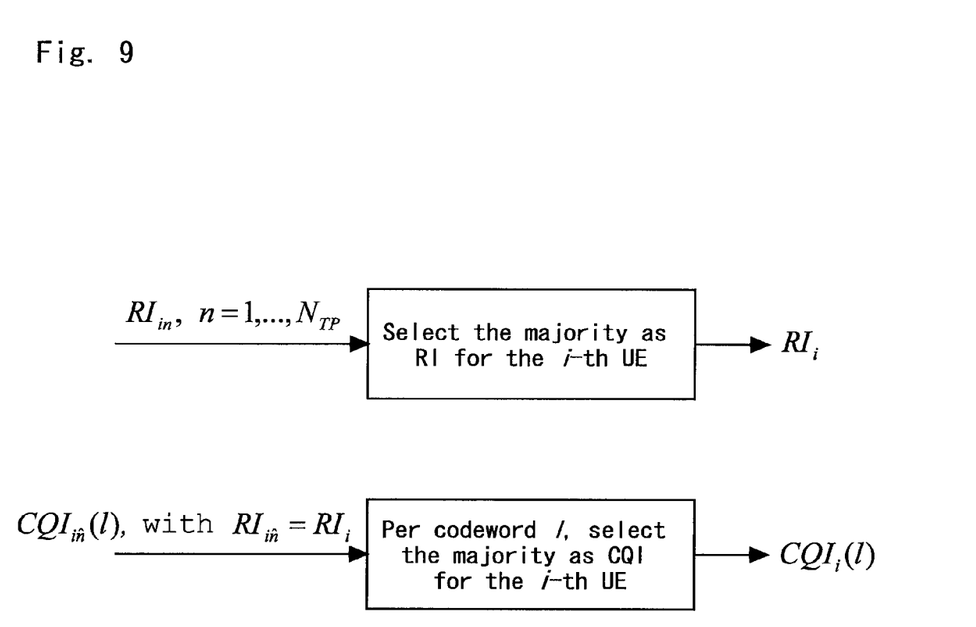
FIG. 9 schematically illustrates RI and CQI collection from the reported RI and CQI for transmission to the i-th UE.

D) Rank and CQI selection (see FIG. 9)

Because, for a given UE, all TPs have common transmission rank and common CQI, it follows that rank and CQI selection is necessary. From the as many as $N_{TP}$ reported $RI_{in}$, the majority is selected as the single common $RI_i$ for the i-th UE. The selection can be done using the histogram. Then only $CQI_{i\hat{n}}$ (l) associated with the selected $RI_i$ are the candidates for CQI selection. The selection is carried out per codeword independently. The majority among the candidates is selected as the common CQI for the l-th codeword $CQI_i(l)$. The selection can be done using the histogram.

Advantages

As discussed above, embodiments of the present invention do not require knowledge of the channel to generate the j-MMSE precoder. Rather, they require only the PMI which is fed back by UEs. This may provide a number of advantages. For instance, it may provide improved performance in comparison with methods which directly use reported PMI. Also, as is made evident above, the invention is applicable to both coherent and non-coherent precoding.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural, systems or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australia Patent Application No. 2013902955, filed on Aug. 7, 2013, the disclosure of which is incorporated herein in its entirety by reference.

REFERENCE SIGNS LIST

TP0 SERVING TP
TP1 NEIGHBOURING TP

The invention claimed is:

1. A method for generating precoders for joint transmission (JT) in a downlink coordinated multi-point transmission/reception (DL CoMP) wireless communications system, the system including a plurality of transmission points (TPs) operable to communicate with a plurality of user equipments (UEs) wherein each UE has one of the TPs as its serving TP, and the method comprises:

transmitting channel state information (CSI) from each UE to its serving TP, wherein the transmitted CSI includes precoder matrix indicators (PMI), and using the PMI to generate precoders for transmission of data from the plurality of TPs to the plurality of UEs, wherein using the PMI to generate precoders involves using the PMI to find a representative matrix ($\hat{H}_{in}$) representing the channel ($H_{in}$) between an n-th TP and an i-th UE, wherein a fixed codebook ($\Omega_{RI}$) of representative matrices is generated from PMI codebook(s), the CSI transmitted from each UE to its serving TP includes a rank indicator (RI), and $\Omega_{RI}$ is different for different RI, and if the RI for the i-th UE ($RI_i$) is equal to the number of receive antennas of the UE ($N_{RX}$) (i.e. if $RI_i = N_{RX}$) then $\Omega_{RI}$ contains matrices $\hat{H}(m)$, $m=1, \ldots$ of size $N_{RX} \times \tau_n$, where $\tau_n$ is the number of antennas at the n-th TP, $i=1, \ldots, N_{UE}$, $n=1, \ldots, N_{TP}$ where $N_{TP}$ and $N_{UE}$ are the number of TPs and UEs, respectively.

2. The method as claimed in claim 1, wherein, if $RI_i$ is less than $N_{RX}$ (i.e. if $RI_i < N_{RX}$) then $\Omega_{RI}$ contains vectors $\hat{h}(m)$, $m=1, \ldots$ of size $\tau_n \times 1$.

3. The method as claimed in claim 2 wherein, for $RI_i = N_{RX}$, the representative matrix $\hat{H}_{in}$ is found by:

$$\hat{H}_{in} = \hat{H}(m^*) \in \Omega_{RI}, i=1, \ldots, N_{UE}, n=1, \ldots, N_{TP}$$

with $$m^* = \arg\max_m tr\{[\hat{H}(m)W_{in}]^H[\hat{H}(m)W_{in}]\}, \hat{H}(m) \in \Omega_{RI}$$

where $N_{TP}$ and $N_{UE}$ are the number of TPs and UEs, respectively, and $W_{in}$ (size $\tau_n \times RI_i$) is a precoder associated with a reported PMI used for precoding data to send from the n-th TP to the i-th UE according to 3GPP standard (TS 36.211).

4. The method as claimed in claim 3 wherein, for $RI_i < N_{RX}$, the representative matrix $\hat{H}_{in}$ is found by:

a) calculating correlation values as:

$$C_{in}(m) = tr\{[\hat{h}^H(m)W_{in}]^H[\hat{h}^H(m)W_{in}]\}, m=1, \ldots$$

and b) sorting to find the $N_{RX}$ largest correlation values $C_{in}(m_1) > C_{in}(m_2) > \ldots > C_{in}(m_{N_{RX}})$ and the corresponding vectors $\hat{h}(m_1), \hat{h}(m_2), \ldots, \hat{h}(m_{N_{RX}})$ to form the channel matrix $$\hat{H}_{in} = [\hat{h}(m_1), \hat{h}(m_2), \ldots, \hat{h}(m_{N_{RX}})]^H$$

5. The method as claimed in claim 4, wherein non-coherent precoding is used and the method further comprises using the representative matrix $\hat{H}_{in}$, a Lagrange multiplier $\nu_n$ and a noise variance estimate $\sigma_i^2$ to compute the precoders ($V_{in}$).

6. The method as claimed in claim 5, wherein precoders $V_{in}$ are computed using an iterative procedure.

7. The method as claimed in claim 6, wherein precoders $V_{in}$ are computed using the following iterative procedure where (m) denotes the m-th iteration:

a) initialize a quantity $G_{in}(m=0) = J_{in}$, $i=1, \ldots, N_{UE}$, where $J_{in}$ is a $RI_i \times \tau_n$ matrix with the (a,b)-th element being zero for $a \neq b$ and 1 for $a=b$;

b) compute $V_{in}(m+1)$ using $G_{in}(m)$ and the Lagrange multiplier $\nu_n$ for $i=1, \ldots, N_{UE}$ as follows:

$$V_{in}(m+1) = \left[\sum_{j=1}^{N_{UE}} \hat{H}_{jn}^H G_{jn}^H(m) G_{jn}(m) H_{jn} + \nu_n I\right]^{-1} \hat{H}_{in}^H G_{in}^H(m)$$

c) compute $G_{in}(m+1)$ using $V_{in}(m+1)$ and the noise variance estimate $\sigma_i^2$ for $i=1, \ldots, N_{UE}$ as follows:

$$G_{in}(m+1) = V_{in}^H(m+1)\hat{H}_{in}^H \left[\sum_{j=1}^{N_{UE}} \hat{H}_{in} V_{jn}(m+1) V_{jn}^H(m+1) \hat{H}_{in}^H + \sigma_i^2 I\right]^{-1}$$

d) compute $$E = \sum_{i=1}^{N_{UE}} \|G_{in}(m+1) - G_{in}(m)\|_F^2$$

e) repeat step b), step c) and step d) until $$\sum_{i=1}^{N_{UE}} \|G_{in}(m+1) - G_{in}(m)\|_F^2 < \varepsilon,$$

where $\|\cdot\|_F^2$ denotes the Frobenius norm and $\varepsilon$ is a convergent threshold; and f) output $V_{in}(m+1)$, $i=1, \ldots, N_{UE}$.

8. The method as claimed in claim 7, wherein the Lagrange multiplier $\nu_n$ for the n-th TP is computed using the following procedure:

a) compute $\lambda_k$ as $$U \Lambda U^H = \sum_{i=1}^{N_{UE}} \hat{H}_{in}^H G_{in}^H(m) G_{in}(m) \hat{H}_{in}$$

b) set $\nu_{min}$ and $\nu_{max}$;

c) set $v_n = (v_{max} + v_{min})/2$;
d) compute a quantity $$\hat{P}_n = \sum_{k=1}^{r_n} \frac{\lambda_k}{(\lambda_k + v_n)^2};$$

e) check if $\hat{P}_n > P_n$ and if so set $v_{min} = v_n$ otherwise set $v_{max} = v_n$, where $P_n$ is the transmit power of the n-th TP;
f) repeat step c), step d) and step e) until $|\hat{P}_n - P_n| < \epsilon$, where $\epsilon$ is a convergent threshold; and
g) output $v_n$.

9. The method as claimed in claim 4, wherein coherent precoding is used and the method further comprises finding a representative matrix $\hat{H}_i$ representing the total channel as follows:

$$\hat{H}_i = [\hat{H}_{i1}, \hat{H}_{i2}, \ldots, \hat{H}_{iN_{TP}}], i=1, \ldots, N_{UE}$$

10. The method as claimed in claim 9, wherein the method further comprises using the representative matrix $\hat{H}_i$, a Lagrange multiplier $v$ and a noise variance estimate $\sigma_i^2$ to compute the precoders ($V_i$).

11. The method as claimed in claim 10, wherein precoders $V_i$ are computed using an iterative procedure.

12. The method as claimed in claim 11, wherein precoders $V_i$ are computed using the following iterative procedure where (m) denotes the m-th iteration:
a) initialize $G_i(m=0) = J_i$, $i=1, \ldots, N_{UE}$, where $J_i$ is a $RI_i \times N_{TX}$ matrix with the (a,b)-th element being zero for $a \neq b$ and 1 for $a=b$, and $N_{TX}$ is the total number of transmit antennas of all TPs;
b) compute $V_i(m+1)$ using $G_i(m)$ and the Lagrange multiplier $v$ for $i=1, \ldots, N_{UE}$ as follows:

$$V_i(m+1) = \left[\sum_{j=1}^{N_{UE}} \hat{H}_j^H G_j^H(m) G_j(m) \hat{H}_j + vI\right]^{-1} \hat{H}_i^H G_i^H(m)$$

c) compute $G_i(m+1)$ using $V_i(m+1)$ and the noise variance estimate $\sigma_i^2$ for $i=1, \ldots, N_{UE}$ as follows:

$$G_i(m+1) = V_i^H(m+1) \hat{H}_i^H \left[\sum_{j=1}^{N_{UE}} \hat{H}_i V_j(m+1) V_j^H(m+1) \hat{H}_i^H + \sigma_i^2 I\right]^{-1}$$

d) compute $$E = \sum_{i=1}^{N_{UE}} \|G_i(m+1) - G_i(m)\|_F^2$$

e) repeat step b), step c) and step d) until $$\sum_{i=1}^{N_{UE}} \|G_i(m+1) - G_i(m)\|_F^2 < \varepsilon;$$

f) output $V_i(m+1)$, $i=1, \ldots, N_{UE}$.

13. The method as claimed in claim 12, wherein the Lagrange multiplier $v$ is computed using the following procedure:

a) compute $\lambda_k$ as $$U\Lambda U^H = \sum_{i=1}^{N_{UE}} \hat{H}_i^H G_i^H(m) G_i(m) \hat{H}_i$$

b) set $v_{min}$ and $v_{max}$;
c) set $v = (v_{max} + v_{min})/2$;
d) compute the following quantity $$\hat{P} = \sum_{k=1}^{N_{TX}} \frac{\lambda_k}{(\lambda_k + v)^2};$$

e) check if $\hat{P} > P$ then set $v_{min} = v$ otherwise set $v_{max} = v$, where P is the total transmit power $$P = \sum_{n=1}^{N_{TP}} P_n;$$

f) repeat step c), step d) and step e) until $|\hat{P} - P| < \epsilon$, where $\epsilon$ is a convergent threshold; and
g) output the Lagrange multiplier $v$.

14. The method as claimed in claim 10, wherein the CSI transmitted from each UE to its serving TP includes a channel quality indicator (CQI) and the noise variance estimate $\sigma_i^2$ is found using the CQI as follows:
a) find the signal to interference plus noise ratio ($SINR_{i1}$) based on the SINR thresholds in the CQI table; and
b) calculate $\sigma_i^2$ using the $SINR_{i1}$ and the serving TP's transmit power $P_s$ as follows:

$$\sigma_i^2 = \frac{P_s / N_{UE}}{\sum_{l=1}^{L_i} SINR_{il} / L_i}, \quad i=1, \ldots, N_{UE}$$

where $L_i$ is the number of codewords used for the i-th UE.

15. The method as claimed in claim 14 wherein, from as many as $N_{TP}$ reported $RI_{in}$, the majority is selected as a single common $RI_i$ for the i-th UE.

16. The method as claimed in claim 15, wherein only $CQI_{in}(l)$ associated with the selected $RI_i$ are candidates for CQI selection, the selection is carried out per codeword independently, and the majority among the candidates is selected as the common CQI for the l-th codeword $CQI_i(l)$.

17. The method as claimed in claim 5, wherein the CSI transmitted from each UE to its serving TP includes a channel quality indicator (CQI) and the noise variance estimate $\sigma_i^2$ is found using the CQI as follows:
a) find the signal to interference plus noise ratio ($SINR_{i1}$) based on thresholds in the CQI table; and
b) calculate $\sigma_i^2$ using the $SINR_{i1}$ and the serving TP's transmit power $P_s$ as follows:

$$\sigma_i^2 = \frac{P_s / N_{UE}}{\sum_{l=1}^{L_i} SINR_{il} / L_i}, \quad i=1, \ldots, N_{UE}$$

where $L_i$ is the number of codewords used for the i-th UE.

18. The method as claimed in claim 17 wherein, from up to $N_{TP}$ reported $RI_{in}$, the majority is selected as a single common $RI_i$ for the i-th UE.

19. The method as claimed in claim 18, wherein only $CQI_{in}(l)$ associated with the selected $RI_i$ are candidates for CQI selection, the selection is carried out per codeword independently, and the majority among the candidates is selected as a common CQI for the l-th codeword $CQI_i(l)$.

20. A downlink coordinated multi-point transmission/reception (DL CoMP) wireless communications system in which joint transmission (JT) is performed between a plurality of transmission points (TPs) and a plurality of user equipments (UEs), wherein each UE has one of the TPs as its serving TP, channel state information (CSI) is transmitted from each UE to its serving TP, the transmitted CSI includes precoder matrix indicators (PMI), and the PMI is used to generate precoders for transmission of data from the plurality of TPs to the plurality of UEs, wherein using the PMI to generate precoders involves using the PMI to find a representative matrix ($\hat{H}_{in}$) representing the channel ($\hat{H}_{in}$) between an n-th TP and an i-th UE, wherein a fixed codebook ($\Omega_{RI}$) of representative matrices is generated from PMI codebook(s), the CSI transmitted from each UE to its serving TP includes a rank indicator (RI), and $\Omega_{RI}$ is different for different RI, and if the RI for the i-th UE ($RI_i$) is equal to the number of receive antennas of the UE ($N_{RX}$) (i.e. if $RI_i=N_{RX}$) then $\Omega_{RI}$ contains matrices $\hat{H}(m)$, m=1, . . . of size $N_{RX} \times \tau_n$, where $\tau_n$ is the number of antennas at the n-th TP, i=1, . . . , $N_{UE}$, n=1, . . . , $N_{TP}$ where $N_{TP}$ and $N_{UE}$ are the number of TPs and UEs, respectively.

\* \* \* \* \*